(12) United States Patent
Nakazawa

(10) Patent No.: US 7,322,596 B2
(45) Date of Patent: Jan. 29, 2008

(54) AIRBAG APPARATUS

(75) Inventor: Wataru Nakazawa, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 11/599,990

(22) Filed: Nov. 16, 2006

(65) Prior Publication Data
US 2007/0138767 A1 Jun. 21, 2007

(30) Foreign Application Priority Data
Dec. 19, 2005 (JP) .............. 2005-365137

(51) Int. Cl.
*B60R 21/16* (2006.01)
*B60R 21/203* (2006.01)

(52) U.S. Cl. ............... 280/728.2; 280/728.3
(58) Field of Classification Search ............ 280/728.2, 280/728.3
See application file for complete search history.

(56) References Cited

U.S. PATENT DOCUMENTS

| | | | |
|---|---|---|---|
| 5,846,620 A * | 12/1998 | Compton | 428/35.7 |
| 6,206,409 B1 | 3/2001 | Kato et al. | |
| 6,338,499 B2 * | 1/2002 | Ueno et al. | 280/732 |
| 6,406,056 B2 * | 6/2002 | Yokota | 280/728.2 |
| 6,435,548 B2 * | 8/2002 | Suzuki et al. | 280/732 |
| 6,579,584 B1 * | 6/2003 | Compton | 428/35.7 |
| 6,585,292 B2 * | 7/2003 | Abe et al. | 280/743.1 |
| 6,612,607 B1 * | 9/2003 | Takahashi | 280/728.3 |
| 6,830,792 B1 * | 12/2004 | Matsuoka et al. | 428/35.7 |
| 7,150,470 B2 * | 12/2006 | Okada et al. | 280/743.1 |
| 2006/0012157 A1 * | 1/2006 | Ishiguro et al. | 280/731 |
| 2006/0110617 A1 * | 5/2006 | Kitaike et al. | 428/522 |
| 2006/0191806 A1 * | 8/2006 | Takata | 206/223 |

FOREIGN PATENT DOCUMENTS

JP   H08-156733   6/1996
JP   H11-28997    2/1999

* cited by examiner

*Primary Examiner*—Paul N. Dickson
*Assistant Examiner*—Joselynn Y. Sliteris
(74) *Attorney, Agent, or Firm*—Manabu Kanesaka

(57) ABSTRACT

In airbag apparatus mounted on a vehicle, a folded shape of an airbag is held by an airbag-holding member disposed over an outer surface of the airbag, and is housed in a retainer. The airbag-holding member is made of a translucent film sheet, in which a plurality of resin layers is stacked in a thickness direction. The folded shape of the airbag can be visually confirmed.

5 Claims, 5 Drawing Sheets

AIRBAG APPARATUS

BACKGROUND OF THE INVENTION AND RELATED ART STATEMENT

The present invention relates to an airbag apparatus for use in a motor vehicle mounted on the motor vehicle, more particular, a construction technology thereof.

Hitherto, a construction of an airbag apparatus, in which an airbag is developed and expanded in an occupant restraining area at a time when a motor vehicle collision is caused, is known. Further, in Japanese Patent Publication No. 11-28997, which discloses this kind of airbag apparatus, a folded shape of the airbag is held by means of a holding member constructed of a cloth to hold the previously folded airbag. However, in such an airbag apparatus, it is difficult to confirm whether a holding operation for holding the folded shape is also securely performed by means of the holding member after the holding member is further mounted, upon securely holding the folded shape of the airbag by means of the holding member.

For example, in a case that part of the airbag is held by means of a holding portion formed from the cloth, as the holding member described in Japanese Patent Publication No. 11-28997, it is possible to confirm the folded shape of the airbag at a non-holding portion where the holding member does not reach. However, because of a construction provided with the holding portion, it is difficult to figure out the folded shape across the entire airbag without exception. However, when an area of the holding portion is decreased, a possibility that the folded shape of the airbag is figured out is increased. At this time, a problem occurs. That is, an original object such that the folded shape of the airbag is held by means of the holding member, is difficult to achieve.

Accordingly, the present invention is made in consideration of the above-described point of view, and it is an object of the invention to provide a technology effective for stabilizing a quality with regard to holding the folded shape of the airbag previously folded, in an airbag apparatus for use in a motor vehicle mounted on a motor vehicle.

Further objects and advantages of the invention will be apparent from the following description of the invention.

SUMMARY OF THE INVENTION

The present invention is applied to an airbag apparatus mounted on various types of motor vehicles, such as automobile, trucks, buses, electric trains, boats and ships, motor cycles, and so forth.

A first aspect of the present invention for solving the aforementioned problem is an airbag apparatus, which includes an airbag, an airbag housing portion, an airbag cover, a gas-supplying portion, and an airbag-holding member.

The airbag in the present invention is constructed as an airbag being expanded while being developed in a predetermined developing and expanding area at a time of a motor vehicle accident, and restraining bodies inside and outside a motor vehicle. Objects to be restrained by the airbag include an occupant seated in a driver's seat, an occupant seated in a passenger seat, an occupant seated in a seat other than the driver's seat or the passenger seat, such as a rear seat, a pedestrian outside a motor vehicle, or the like. Accordingly, in a developing and expanding area where the airbag according to the present invention is developed and expanded, not only an in-car area where an occupant as the restraining object exists, but also an area outside the motor vehicle where the pedestrian as the restraining object exists are widely included.

The airbag housing portion according to the present invention is constructed to house the airbag in a folded condition folded in a predetermined configuration, and to include an airbag opening that allows the airbag to be developed and expanded. As the "predetermined configuration" described here, a roll-folding configuration formed in a manner such that the airbag is retracted into a roll shape, a bellows folding configuration formed in a manner such that the airbag is folded into a bellows shape, a folding configuration in which these configurations are combined with each other, and the like, are listed. The airbag housed in the airbag housing portion protrudes outside the airbag housing portion through the airbag opening at a time when the airbag is developed and expanded. The airbag opening is covered by means of the airbag cover according to the present invention.

The gas supplying portion according to the present invention has a function for supplying the gas for expanding the airbag so as to develop and expand the airbag to an occupant restraining area, when the motor vehicle accident occurs. In detail, the gas supplying portion has a construction for generating the gas for expanding the airbag by means of detecting an occurrence of the motor vehicle accident, and for introducing the gas for expanding the airbag into an inside of the airbag.

The airbag-holding member according to the present invention has a function to hold a folded shape of the airbag, while being fixed to an outer surface of the airbag in a folded condition, which is housed in the airbag housing portion, in a partitioned area partitioned by the airbag housing portion and the airbag cover. In particular, in the present invention, the airbag-holding member is constructed by using a translucent film sheet in which a plurality of resin layers is formed in a layer-stack manner with regard to a sheet cross-sectional direction. It is sufficient that the translucent film sheet described here enables visible confirmation through the film sheet regardless of the small or large of a degree of the translucency. As for the film sheet, a transparent film sheet and a half transparent film sheet (translucent white film sheet or colored film sheet) can appropriately be used. That is, the airbag-holding member according to the present invention is provided with a function to enable the folded condition of the airbag to be visually confirmed (sometimes called "visibility function") at a time of mounting the airbag-holding member, and at a time after mounting the same, in addition to an original function to hold the folded shape of the airbag in the folded condition by using the translucent film sheet.

Incidentally, with regard to the visibility function of the airbag-holding member according to the present invention, there are a first visibility configuration in which the folded condition is visually confirmed before the airbag in the folded condition is housed in the airbag housing portion, and a second visibility configuration in which the folded condition is visibly confirmed after the airbag in the folded condition is housed in the airbag housing portion. In a case that the first visibility configuration is considered, it is preferable that the visibility function of the translucent film sheet is applied to an entire area of the film sheet. By means of the above-described configuration, it becomes possible to visibly confirm the folded condition from various directions through the film sheet before the airbag in the folded condition is housed in the airbag housing portion.

On the other hand, in a case that the second visibility configuration is considered, it is preferable that the visibility function of the translucent film sheet is applied to at least a portion that is visible from a side of the airbag opening in each of portions of the film sheet. By means of the above-described configuration, it becomes possible to visually confirm the folded condition from the side of the airbag opening after the airbag in the folded condition is housed in the airbag housing portion. Needless to say, the visibility function of the translucent film sheet may be applied to an entire area of the film sheet in a case that the second visibility configuration is considered.

Further, in the present invention, as for a construction in which a plurality of resin layers is formed in a layer-stack manner with regard to a sheet cross-sectional direction, a single film sheet having an integrally formed shape including a plurality of resin layers may be used, or a construction in which a plurality of film sheets formed from each of the resin layers is overlapped on each other in the layer-stack manner may be used.

According to such a construction of the airbag apparatus described in the first aspect, the folded shape of the airbag can be held, and it becomes possible to visually confirm whether the folded shape of the airbag in the folded condition is maintained without being deformed, through the translucent film sheet by using the airbag-holding member formed from a translucent film sheet. By means of the above-described configuration, the quality with regard to the holding of the airbag can be maintained.

Further, according to the present invention, the plurality of resin layers of the translucent film sheet can be constructed as a resin layer having another function in addition to the translucency. For example, in the plurality of resin layers of the translucent film sheets, a first resin layer can be configured to be a resin layer having the translucency and high strength, and a second resin layer can be configured to be a resin layer having the translucency and an environmental deterioration resistance. By means of the construction described above, further functions can be applied to the plurality of resin layers of the film sheet constituting the airbag-holding member in addition to the translucency, resulting in forming a rational configuration.

In the airbag apparatus according to a second aspect, the airbag-holding member according to the first aspect has a construction using a film sheet including a resin layer having a translucency and low frictional characteristic for the airbag, as a translucent film sheet. The film sheet with the resin layer is fixed to an outer surface of the airbag in a folded condition to be housed in an airbag housing portion. The resin layer having translucency and low frictional characteristic as described here is configured to be a resin layer having relatively low friction resistance (friction coefficient) relative to a synthetic resin-made airbag.

In accordance with such a construction of the airbag apparatus according to the second aspect, the energy loss caused by frictional resistance between the airbag-holding member and the airbag at a time of developing and expanding operation can be suppressed by disposing the resin layer having low frictional characteristic at the airbag side of the airbag-holding member, where the airbag that is developed and expanded at a time of a motor vehicle accident directly contacts therewith. As a result, smooth developing and expanding operations of the airbag can be realized.

In the airbag apparatus according to a third aspect, the airbag-holding member according to either one of the first aspect or second aspect has a construction using a film sheet including at least a resin layer having translucency and high strength, and a resin layer having translucency and an environmental deterioration resistance, as a translucent film sheet. The resin layer having high strength is defined as being capable of holding a folded shape of the airbag against the force in which the airbag once folded back has a behavior to release the folded back condition. Such a resin layer having high strength is effective for further assuredly holding the folded shape of the airbag in the folded condition after the airbag-holding member is mounted as well.

On the other hand, the resin layer having the environmental deterioration resistance is defined as a resin layer good for weather resistance, such as, heat resistance, moisture resistance, light stability, and so forth. Such a resin layer having environmental deterioration resistance is particularly effective in the airbag apparatus installed at a place, where it is easy to be exposed to open air environment, such as a motor vehicle.

In accordance with such a construction of the airbag apparatus according to the third aspect, the folded shape of the airbag is held, and the visibility from outside with regard to the folded condition of the airbag is secured. In addition, it becomes possible to provide an airbag-holding member in consideration of the strength and the environmental deterioration resistance of the airbag-holding member.

In the airbag apparatus according to a forth aspect, the airbag-holding member according to any one of the first aspect through the third aspect has a construction in which a translucent film sheet is wrapped around and caused to be fixed to an outer surface of the airbag in a folded condition folded in a predetermined configuration with the airbag outer surface including a portion at the airbag opening side. The portion at the airbag opening side described here is defined as a place positioned at an airbag opening side in each of the portions of the airbag in the folded condition.

In accordance with such a construction of the airbag apparatus according to the forth aspect, by using the airbag-holding member formed from a translucent film sheet wrapped around the outer surface of the airbag, the folded shape of the airbag can be held and it becomes possible to visibly confirm whether the folded shape of the airbag in the folded condition is maintained without being deformed, through the translucent film sheet.

The airbag apparatus according to a fifth aspect is constructed such that in the airbag-holding member according to any one of the first aspect through the third aspect, a translucent film sheet is disposed in a manner so as to cover the airbag opening in the airbag housing portion housing the airbag, and the translucent film sheet is fixed to a portion of the folded airbag at the airbag opening side.

In accordance with such a construction of the airbag apparatus according to the fifth aspect, by using the airbag-holding member formed from a translucent film sheet that covers the airbag opening, the folded shape of the airbag can be held and it becomes possible to visibly confirm whether the folded shape of the airbag in the folded condition is maintained without being deformed, through the translucent film sheet.

As described above, according to the present invention, in the airbag apparatus for use in the vehicle, particularly, in the partitioned area partitioned by the airbag housing portion and the airbag cover, the airbag-holding member is disposed to the outer surface of the airbag in the folded condition to hold the folded shape of the airbag by the airbag-holding member, and the airbag-holding member is constructed by using the translucent film sheet in which a plurality of resin layers is formed in a layer-stack manner with regard to a direction of a sheet cross-section. Thus, it becomes possible to visibly confirm the folded shape of the airbag being previously folded, even after the airbag-holding member is mounted. Accordingly, it is possible to maintain the quality with regard to holding the folded shape of the airbag.

DETAILED DESCRIPTION OF THE EMBODIMENTS

Figure 1:
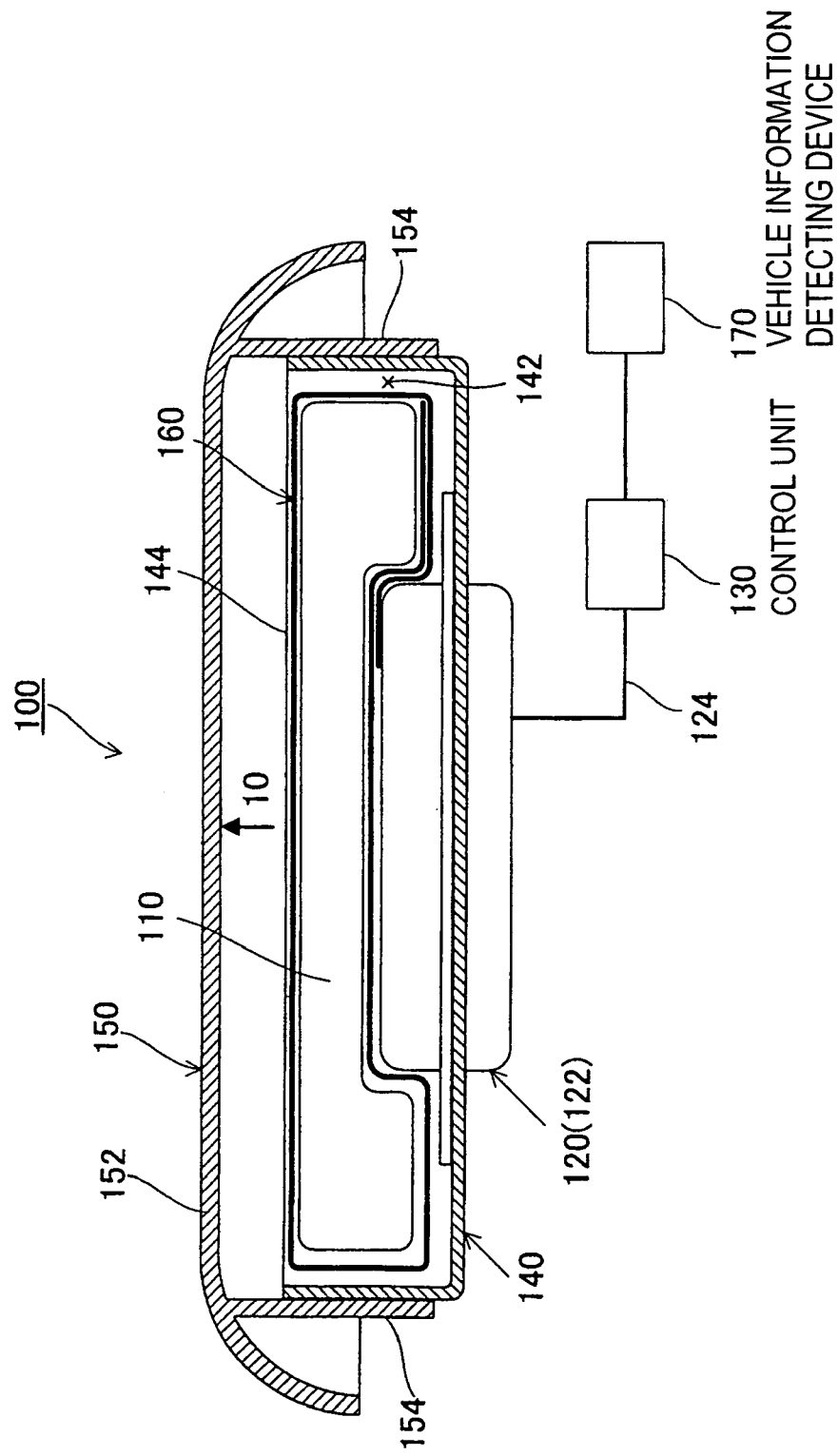
FIG. 1 is a view showing a cross-sectional structure of an embodiment of an airbag apparatus of the present invention.

Hereinafter, embodiments of the present invention will be explained in detail referring to the drawings. Firstly, a construction of an airbag apparatus 100 of the present embodiment will be explained referring to FIGS. 1 through 4. The airbag apparatus 100 is, although not particularly shown, an airbag apparatus mounted corresponding to an occupant seated in a driver's seat of an automobile (hereinafter referred to as vehicle occupant), and is provided with a construction to be built in a steering wheel for steering a vehicle.

A cross-sectional structure of the airbag apparatus 100 serving as "an embodiment of an airbag apparatus" in the present invention is shown in FIG. 1. The airbag apparatus 100 is at least provided with an airbag 110, an inflator 120, a control unit 130, a retainer 140, an airbag cover 150, and an airbag-holding member 160, as basic components.

The airbag 110 has a bag-shape that is developed and expanded so as to restrain the vehicle occupant at a time of a motor vehicle collision, and is formed by stitching a piece of or a plurality of pieces of base cloths formed from synthetic resin into a bag shape. Further, the airbag apparatus 100 is housed in a retainer 140 in a folded condition in a predetermined configuration. As the "predetermined configuration" described above, a roll-folding configuration formed in a manner such that the airbag 110 is folded into a roll shape, a bellows folding configuration formed in a manner such that the airbag 110 is folded into a bellows shape, a folding configuration in which these configurations are mixed, or the like, are typical configurations. The airbag apparatus 110 described here corresponds to the "airbag" in the present invention.

In the inflator 120, a gas-generating portion 122 generating gas for developing and expanding the airbag 110 is built in an internal space of the airbag 110 constructed to be a bag shape. The gas-generating portion 122 is connected to the control unit 130 via a harness 124, and generates the gas for developing and expanding the airbag 110 by activation by an output of a control signal from the control unit 130. The gas for developing and expanding the airbag 110 generated in the gas-generating portion 122 is to be supplied to an internal part of the airbag 110 through a gas-distributing path (not shown).

The control unit 130 is composed of a CPU (Central Processing Unit) having a known construction, a ROM, a RAM, an input and output device, a peripheral device (illustration of any of these devices are omitted), and the like. Further, the control unit 130 is connected to a vehicle information detecting device 170 serving as a component of a motor vehicle side, and outputs a control signal to the gas generating portion 122 on the basis of information transmitted from the vehicle information detecting device 170. Typically, a collision detecting sensor that detects occurrence of the motor vehicle collision on the basis of acceleration or the like applied to the vehicle is used, as the vehicle information detecting device 170. The inflator 120 described here constitutes a "gas supplying portion" in the present invention.

The retainer 140 is constructed as a box-shaped case member having a bottom provided with a function for housing the airbag 110 having the aforementioned construction, and the inflator 120. In particular, in a housing space 142 of the retainer 140 for housing the inflator 120, the inflator 120 is housed at a lower part thereof, and the airbag 110 is housed above the housed inflator 120. At an upper part of the retainer 140, an airbag opening 144 that opens so as to allow the developing and expanding operations of the airbag 110 in the housed condition is formed. The airbag 110 protrudes in a direction indicated by an arrow 10 in FIG. 1, while being developed and expanded through the airbag opening 144 at a time of vehicle collision. The retainer 140 is constructed with a molded member formed from a metal material or a resin material. The retainer 140 described here corresponds to the "airbag housing portion" in the present invention, and the airbag opening 144 of the retainer 140 corresponds to the "airbag opening" in the present invention.

The airbag cover 150 is made of a resin-material and covers the airbag opening 144 of the retainer 140 from above in a condition that the airbag 110 is housed in the retainer 140. Accordingly, the vehicle occupant side of the airbag 110 is covered by the airbag cover 150. The airbag cover 150 is, in particular, provided with a flat plate portion 152 horizontally extending along an opening plane of the airbag opening 144, and a standing portion 154 standing along a wall portion of the retainer 140 from the flat plate portion 152. The airbag cover 150 is fixed to a retainer 140 side at the standing portion 154.

In addition, although not shown, a reduced-thickness portion in which a plate thickness at the flat plate portion 152 and the standing portion 154 is relatively reduced, namely a so-called tear line, is provided in the airbag cover 150. The airbag cover 150 is ruptured along the tear line thereof, resulting in allowing the airbag opening 144 to form an open condition by the force at a time of developing operation of the airbag 110 in a vehicle accident such as a motor vehicle collision. In addition, the airbag cover 150 allows the airbag 110 to protrude outside the retainer 140 through the airbag opening 144. The airbag cover 150 corresponds to the "airbag cover" in the present invention.

The airbag-holding member 160 is a member provided with a function to hold (or may sometimes be called "to maintain") a folded shape of the airbag 110 by providing a film or sheet having translucency to cover an outer surface of the airbag 110 in a folded condition in a predetermined configuration. The airbag-holding member 160 described here corresponds to the "airbag-holding member" in the present invention.

Figure 2:
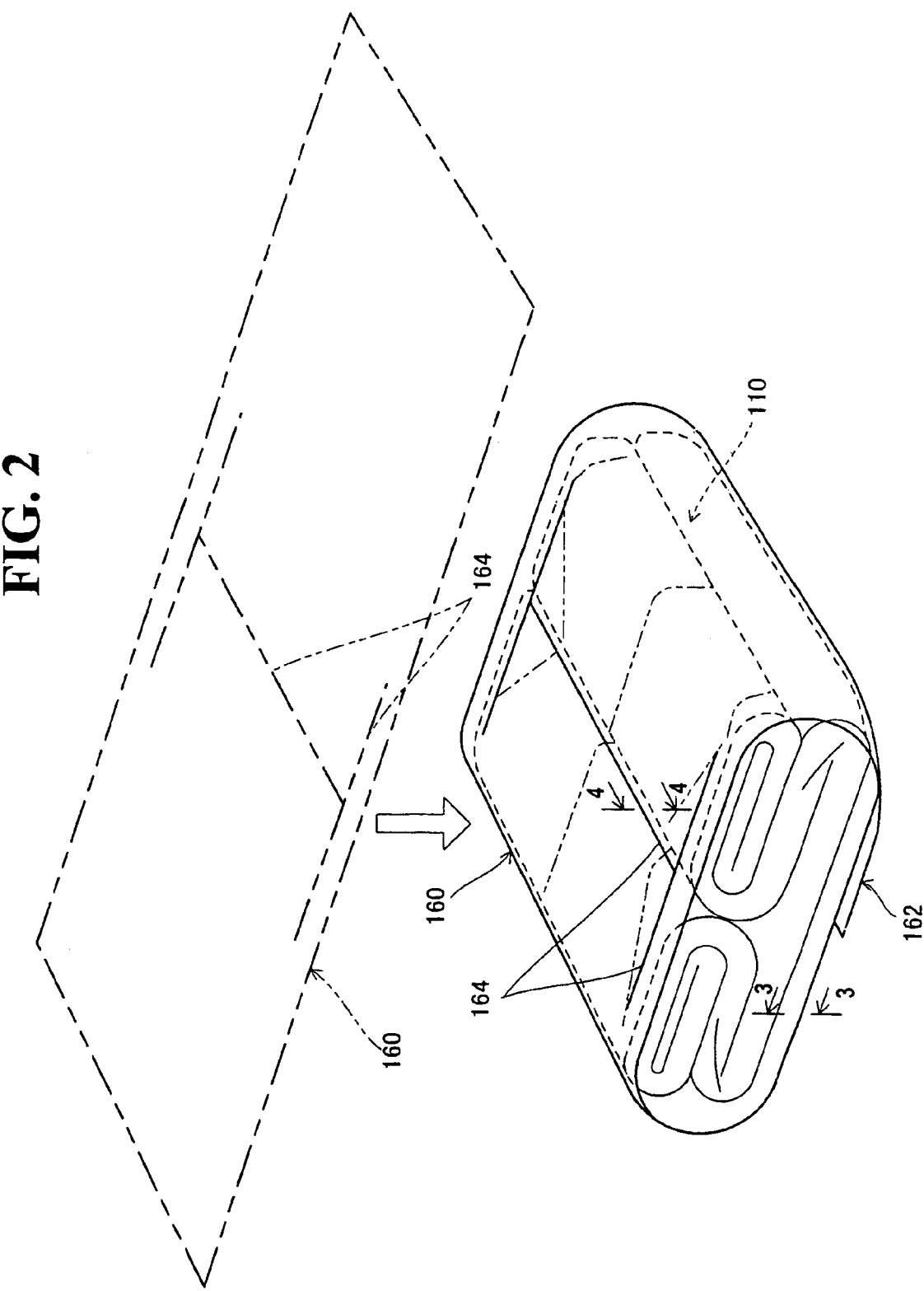
FIG. 2 is a view showing a condition in which the airbag apparatus in a folded condition of the present embodiment is held by means of an airbag-holding member.

Here, a condition in which the airbag 110 in a folded condition of the present embodiment is held by means of the airbag-holding member 160 is shown in FIG. 2. Further, a cross-sectional structure taken along line 3-3 of the airbag-holding member 160 in FIG. 2 is shown in FIG. 3, and a cross-sectional structure taken along line 4-4 of the airbag-holding member 160 in FIG. 2 is shown in FIG. 4.

As shown in FIG. 2, the airbag-holding member 160 in the present embodiment is sheet-shaped to form a film sheet and has translucency. The film sheet is configured to form a wrapped condition, in which the film sheet is wrapped around the outer surface of the airbag 110 in the folded condition, including a portion at an airbag opening 144 side of the airbag 110. In the wrapped condition of the airbag-holding member 160, it is preferable to form an overlapping portion 162 such that both end portions of the film sheet are overlapped on each other. In the present embodiment, only a film sheet is merely wrapped around the airbag 110 in a folded condition, or each of both end portions of the film sheet is further jointed together by means of a heat fusion bonding, a bond, or the like at the overlapping portion 162 upon merely wrapping the film sheet around the airbag 110 in a folded condition.

As a still further construction, a hole portion is provided at each end portion of a film sheet, and each end portion is attached and fixed to a fixing portion (for example, a stud bolt for fixing) provided at the airbag 110 side by being hooked on the fixing portion. In this construction, there is no need to provide a portion such as the overlapping portion 162 where both end portions of the film sheet are overlapped together. By using these constructions, the folded shape of the airbag 110 in the folded condition is securely held by means of the airbag-holding member 160.

Figure 3:
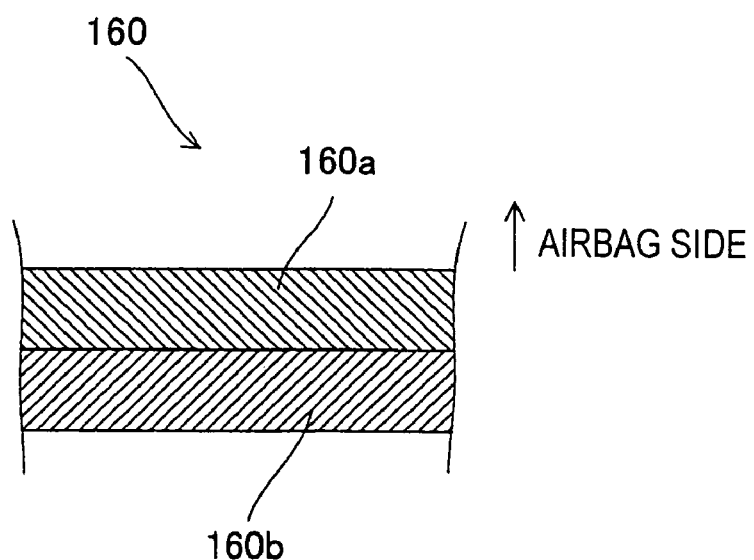
FIG. 3 is a view showing a cross-sectional structure taken along line 3-3 in FIG. 2.
Figure 4:
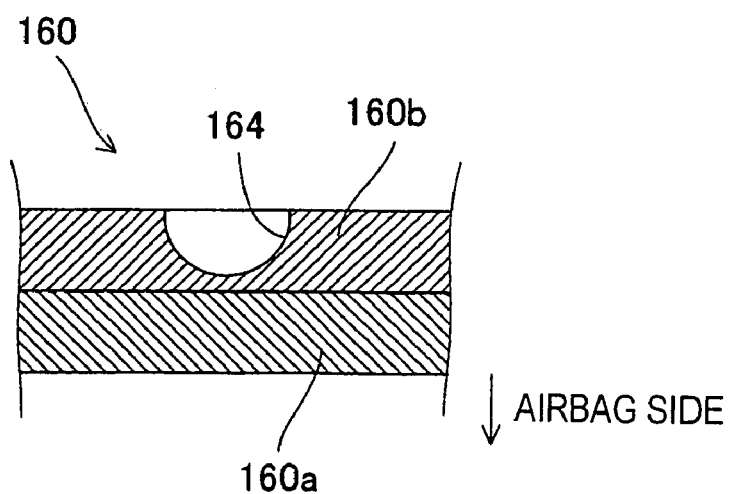
FIG. 4 is a view showing a cross-sectional structure taken along line 4-4 in FIG. 2.

Further, as shown in FIG. 3, the airbag-holding member 160 of the present embodiment may be formed of a film sheet having a two layer structure in which a first resin layer 160a and a second resin layer 160b are disposed in a layer-stack manner with regard to a direction of a film cross-section (sometimes called "sheet cross-sectional direction"). The first resin layer 160a is a resin layer of the airbag side where the airbag 110 directly contacts therewith, and is provided with translucency in a formed condition. Further, the first resin layer 160a is constructed as a resin layer having low frictional characteristic for the airbag 110 formed from synthesized fiber.

The resin layer having low frictional characteristic is defined as a resin layer whose frictional resistance (friction coefficient) relative to the airbag at a time of developing and expanding is relatively low. On the other hand, the second resin layer 160b is a resin layer provided outside the first resin layer 160a, and does not directly contact the airbag 110. The second resin layer 160b is constructed as a resin layer having translucency in a formed condition, and is constructed as a resin layer having high strength. The resin layer having high strength is defined as a resin layer having strength capable of holding a folded shape of the airbag against the force in which the airbag in a condition once folded is likely to release the folded back condition. Incidentally, the film sheet as the airbag-holding member 160 of the present embodiment may be formed of a single film sheet having an integrally formed shape including a portion of the first resin layer 160a and a portion of the second resin layer 160b, or may have a construction in which a film sheet formed from the first resin layer 160a and a film sheet formed from the second resin layer 160b are overlapped on each other in the layer-stack manner.

Further, the present embodiment is constructed such that a reduced thickness portion (sometimes called "weak portion") with regard to a cross-sectional direction is formed in a continuous line manner, namely a so-called tear line 164.

The tear line 164 is provided in an upper surface of the airbag-holding member 160 in a condition of being wrapped around the airbag 110 and housed in the retainer 140. As shown in FIG. 4, the tear line 164 is typically formed in the second resin layer 160b.

As for a method for forming the tear line 164, a method to weaken the second resin layer 160b by means of performing a laser processing for the second resin layer 160b, a method to weaken the film by means of heating by ironing or the like can appropriately be adopted. In this case, a depth of the reduced thickness with regard to the film cross-sectional direction of the tear line 164 can appropriately be set within a limit of the wall thickness of the second resin layer 160b. For example, it is preferable to set the depth of the reduced thickness with regard to the film cross-sectional direction of the tear line 164 so as to keep the strength of the tear line 164 to fall below the holding force caused by wrapping the film sheet for the airbag 110 in the folded condition.

According to the airbag apparatus 100 having the aforementioned construction, since the airbag-holding member 160 is formed from the film sheet having translucency, the airbag-holding member 160 is provided with a function to enable the folded condition of the airbag 110 to be visually confirmed (sometimes called "visibility function") at a time of mounting the airbag-holding member 160, and at a time after mounting the same, in addition to an original function to hold the folded shape of the airbag 110 in a folded condition. As for the translucency of the film sheet, it is sufficient that the visibility can be obtained through the film sheet regardless of a degree of the translucency. As the film sheet, a transparent film sheet and a half transparent film sheet (translucent white film sheet or colored film sheet) can appropriately be used. According to such a construction of the airbag apparatus 100, it becomes possible to visually confirm whether the folded shape of the airbag 110 in the folded condition is maintained without being deformed, through the airbag-holding member 160 as needed. Therefore, with regard to holding the folded shape of the airbag 110, the quality can be maintained.

At this moment, with regard to the visibility function of the airbag-holding member 160, there is considered a first visibility configuration in which the folded condition is visually confirmed before the airbag 110 in the folded condition is housed in the retainer 140, and a second visibility configuration in which the folded condition is visually confirmed after the airbag 110 in the folded condition is housed in the retainer 140. In a case that the first visibility configuration is considered, it is preferable that the visibility function of the translucent film sheet is applied to an entire area of the film sheet. By the above-described configuration, it becomes possible to visually confirm the folded condition from various directions through the film sheet before the airbag 110 in the folded condition is housed in the retainer 140.

On the other hand, in a case that the second visibility configuration is considered, it is preferable that the visibility function of the translucent film sheet is applied to at least a portion that is visible from a side of the airbag opening 144 in each of portions of the film sheet. That is, the translucency is applied to at least the portion corresponding to the airbag opening 144 in each of the portions of the film sheet. By the above-described configuration, it becomes possible to visually confirm the folded condition from the side of the airbag opening 144 after the airbag 110 in the folded condition is housed in the retainer 140. Of course, the visibility function of the translucent film sheet may be applied to an entire area of the film sheet when the second visibility configuration is considered.

Further, in the airbag apparatus 100 having the aforementioned construction, when the airbag 110 is developed and expanded at a time of a motor vehicle accident, developing and expanding force are applied to an internal surface of the airbag-holding member 160. In this case, strength of the tear line 164 of the airbag-holding member 160 is configured to fall below the folding force caused by wrapping of the film sheet around the airbag 110 in the folded condition. Therefore, the airbag-holding member 160 is ruptured along the tear line 164 and releases the holding condition for holding the folded shape of the airbag 110. Further, the developing and expanding operation of the airbag 110 toward the airbag cover 150 side and a protruding operation of the same are allowed. At this moment, the first resin layer 160*a* having low frictional characteristic is disposed at the airbag 110 side of the airbag-holding member 160 of the present embodiment, where the airbag 110 directly contacts therewith. Thus, the energy loss caused by frictional resistance between the airbag-holding member 160 and the airbag 110 at a time of developing and expanding operations can be suppressed, and as a result, smooth developing and expanding operations of the airbag 110 can be made.

On the other hands the film strength of the airbag-holding member 160 itself can be obtained by disposing the second resin layer 160*b* having high strength at the other side, and therefore, it is effective for further assuredly holding the folded shape of the airbag 110 in the folded condition also after the airbag-holding member 160 is mounted. Thus, in the present embodiment, functions with regard to the friction and the strength in addition to the translucency can be applied to the first resin layer 160*a* and the second resin layer 160*b* of the film sheet constituting the airbag-holding member 160, resulting in forming a rational configuration.

Further, the airbag 110 ruptures the airbag cover 150 along the tear line by the force upon developing and expanding thereof, and protrudes outside the retainer 140 through the airbag opening 144. Thus, the airbag 110 being developed and expanded at the predetermined occupant restraining area can restrain the vehicle occupant.

Figure 5:
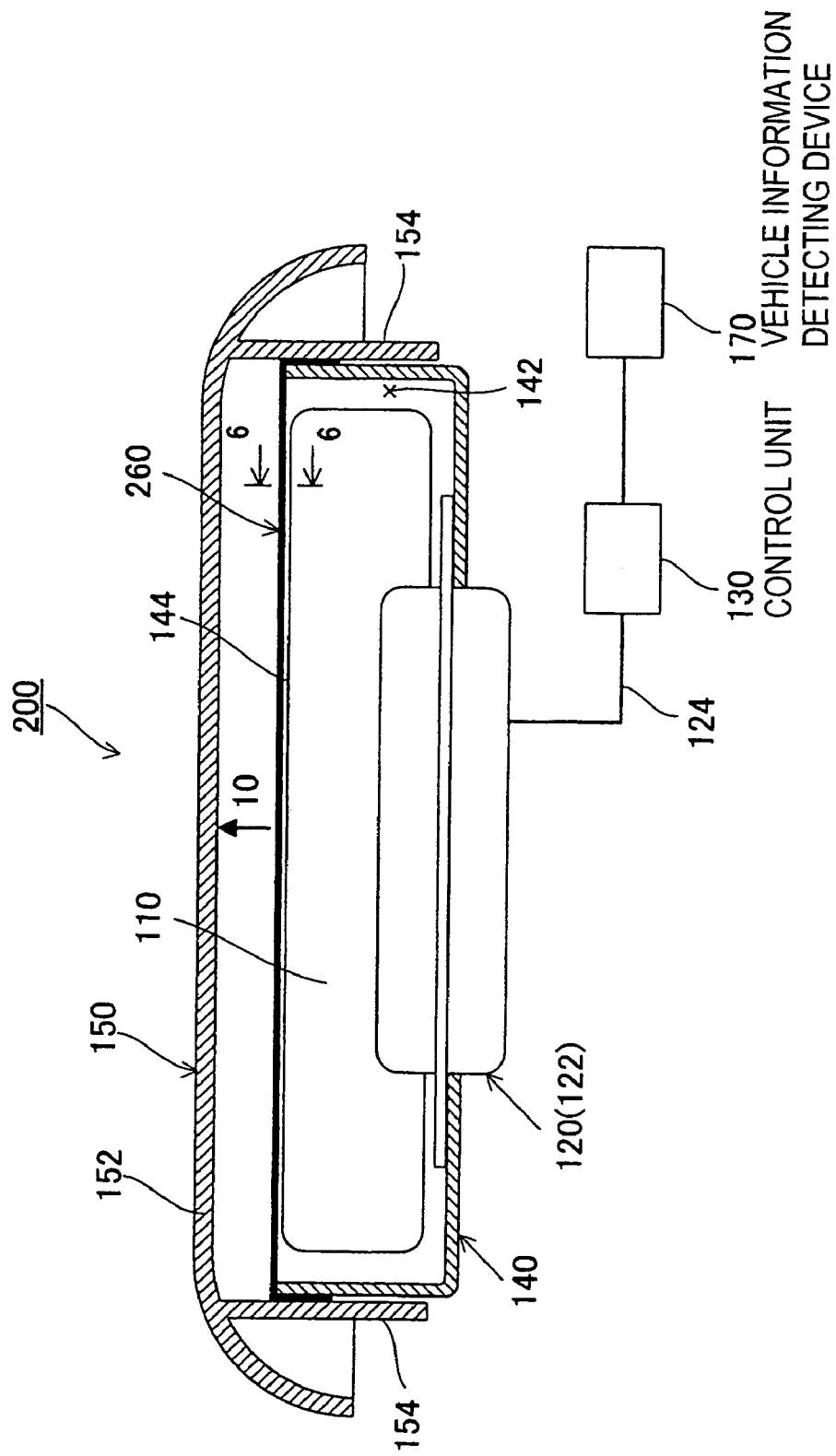
FIG. 5 is a view showing a cross-sectional structure of an embodiment of an airbag apparatus of the present invention.

Incidentally, as for a device for holding the folded shape of the airbag 110 in the folded condition, another construction can also be adopted instead of the airbag-holding member 160 having the aforementioned construction. At this moment, an airbag apparatus provided with an airbag-holding member 260 having a construction different from that of the airbag apparatus 160 will be explained referring to FIGS. 5 and 6. In FIG. 5, a cross-sectional structure of an airbag apparatus 200 as an embodiment of the "airbag apparatus" in the present invention is shown. Further, a cross-sectional structure taken along line 6-6 of the airbag-holding member 260 in FIG. 5 is shown in FIG. 6.

The airbag apparatus 200, shown in FIG. 5 adopts a construction in which the airbag-holding member 260 is attached to the airbag opening 144 of the retainer 140 instead of wrapping the airbag-holding member 160 around the airbag 110 in the folded condition. The components other than that of the airbag apparatus 200 are identical of those of the airbag apparatus 100, shown in FIG. 1.

The airbag-holding member 260 is formed of a translucent film sheet similar to that of the above-described airbag-holding member 160. The airbag-holding member 260 is a member provided with a function to maintain the folded shape of the airbag 110 by attaching the translucent film sheet to the retainer 140 in a condition of housing the airbag 110, in a manner so as to cover the airbag opening 144, and causing the translucent film sheet to be fixed to a portion of the airbag opening 144 side of the airbag 110 in a folded condition. The airbag-holding member 260 described here corresponds to the "airbag-holding member" in the present invention.

Figure 6:
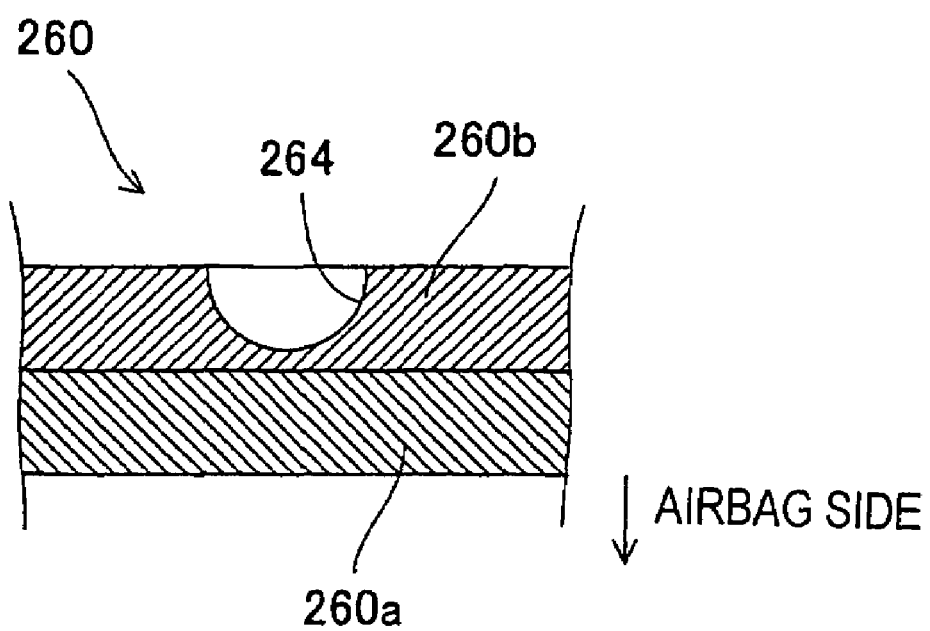
FIG. 6 is view showing a cross-sectional structure taken along line 6-6 of the airbag-holding member in FIG. 5.

As shown in FIG. 6, the airbag-holding member 260 is formed to be a film sheet having a two layer structure in which a first resin layer 260*a* and a second resin layer 260*b* are disposed in the layer-stack manner with regard to a direction of a sheet cross-section. The first resin layer 260*a* is a film portion at the airbag 110 side where the airbag 110 directly contacts therewith, and is provided with translucency in a formed condition. Further, the first resin layer 260*a* has a construction similar to that of the first resin layer 160*a* having low frictional characteristic for the airbag 110 formed from the synthetic resin.

On the other hand, the second resin layer 260*b* is a film portion provided outside the first resin layer 260*a*, and does not directly contact with the airbag 110. The second resin layer 260*b* has translucency in a formed condition and has a construction similar to that of the second resin layer 160*b* having high strength. Further, in the airbag-holding member 260, a tear line 264 similar to the above-described tear line 164 is provided in the second resin layer 260*b* in the first resin layer 260*a* and the second resin layer 260*b*. Incidentally, the film sheet serving as the airbag-holding member 260 in the present embodiment may be formed of a single film sheet having an integrally formed shape including a portion of the first resin layer 260*a* and a portion of the second resin layer 260*b*, or may have a construction in which a film sheet formed from the first resin layer 260*a* and a film sheet formed from the second resin layer 260*b* are overlapped on each other in the layer-stack manner.

According to the airbag apparatus 200 having the aforementioned construction, since the airbag-holding member 260 is formed from the film sheet having translucency, the airbag-holding member 260 is provided with a function of enabling the folded condition of the airbag 110 to be visually confirmed at a time of mounting the airbag-holding member 260, and at a time after mounting the same, in addition to an original function to hold the folded shape of the airbag 110 in a folded condition. According to such a construction of the airbag apparatus 200, it becomes possible to visually confirm whether the folded shape of the airbag 110 is maintained without being deformed, through the airbag-holding member 260 as needed. Therefore, with regard to holding the folded shape of the airbag 110, the quality can be maintained.

Further, according to the present embodiment, further functions with regard to the friction and the strength in addition to the translucency can be applied to the first resin layer 260*a* and the second resin layer 260*b* of the film sheet constituting the airbag-holding member 260, resulting in forming the rational configuration.

Incidentally, the present invention is not limited to only the aforementioned embodiment and various types of applications and modifications are considered. For example, below mentioned configurations to which the aforementioned embodiments are applied can also be carried out.

In the aforementioned embodiments, the airbag-holding members, 160 and 260, are constructed by using a film sheet having the two layer structure in which a first resin layer and a second resin layer are disposed in the layer-stack manner. However, in the present invention, the airbag-holding member may be constructed by using a film sheet having a multilayer structure in which still another resin layer is disposed in a film sheet having the two layer structure, in the layer-stack manner. In this case, as a resin layer to be added, a resin layer having the translucency and environmental deterioration resistance may be used. The resin layer having the environmental deterioration resistance described here is defined as a resin layer good at weather resistance such as, heat resistance, moisture resistance, light stability, and so forth. Such a resin layer having environmental deterioration resistance is particularly effective in the airbag apparatus installed at a place, which is easy to be exposed to the open air environment, such as a vehicle.

Further, in the aforementioned embodiment, although the airbag apparatus equipped for a vehicle occupant seated in a driver's seat of an automobile is described, the present invention may also be applied to a construction of the airbag apparatus equipped for a vehicle occupant seated in a seat other than the driver's seat, for example, to a vehicle occupant seated in a passenger seat or a rear seat, or further, to a construction of the airbag apparatus equipped for a pedestrian outside the motor vehicle. As for an airbag apparatus for restraining a pedestrian outside the motor vehicle, the airbag apparatus can typically be mounted on a vehicle bonnet portion, a cowl portion, an A-pillar portion, and so forth.

Furthermore, in the aforementioned embodiment, although the description is made with regard to the airbag apparatus mounted on the automobile, the present invention may also be applied to an airbag apparatus in the vehicles other than the automobile, such as, for example, trucks, buses, electric trains, boats and ships, motor cycles, and so forth.

The disclosure of Japanese Patent Application No. 2005-365137 filed on Dec. 19, 2005 is incorporated as a reference.

While the invention has been explained with reference to the specific embodiments of the invention, the explanation is illustrative and the invention is limited only by the appended aspects.

What is claimed is:

1. An airbag apparatus mounted on a vehicle comprising:
   an airbag;
   an airbag housing portion for housing the airbag folded in a predetermined configuration and including an airbag opening for allowing the airbag to be developed and expanded;
   an airbag cover for covering the airbag opening;
   a gas-supplying device for supplying gas to the airbag to expand and develop the airbag in a developing and expanding area when a vehicle accident occurs; and
   an airbag-holding member for holding the folded airbag, disposed over an outer surface of the folded airbag housed in the airbag housing portion to partition the airbag housing portion and the airbag cover, said airbag-holding member being formed of translucent first and second resin layers stacked in a sheet thickness direction, said first resin layer being disposed at a side directly contacting the airbag and having a low frictional characteristic for the airbag, and said second resin layer being disposed over the first resin layer and having a strength greater than that of the first resin layer, said second resin layer having, as a tear line, a reduced thickness portion extending from an outer surface toward the first resin layer.

2. An airbag apparatus according to claim 1, wherein the airbag-holding member is fixed to an outer surface of the airbag in a folded condition to be housed in the airbag housing portion.

3. An airbag apparatus according to claim 1, wherein the airbag-holding member is arranged to wrap around an outer surface of the airbag with an airbag open side, folded in a predetermined configuration.

4. An airbag apparatus according to claim 1, wherein the airbag-holding member is arranged such that the first and second resin layers cover the airbag opening of the airbag housing portion, and the first and second resin layers are fixed to an opening side of the airbag housing portion.

5. An airbag apparatus according to claim 1, wherein said airbag-holding member has a rectangular shape to cover four sides of the folded airbag.

* * * * *